(12) United States Patent
Ramos Loza

(10) Patent No.: US 6,192,917 B1
(45) Date of Patent: Feb. 27, 2001

(54) SELF-SEALING VALVE FOR BALLOONS OR NON ELASTOMER ARTICLES, OBTAINED BY A MASS PRODUCTION PROCESS

(76) Inventor: Ernesto Antonio Ramos Loza, Rio de la Plata 2579-1, Col. Providencia Zapopan, Jalisco (MX), 44630

( * ) Notice: Subject to any disclaimer, the term of this patent is extended or adjusted under 35 U.S.C. 154(b) by 0 days.

(21) Appl. No.: 09/171,068

(22) PCT Filed: Sep. 4, 1997

(86) PCT No.: PCT/MX97/00010

§ 371 Date: Feb. 17, 1999

§ 102(e) Date: Feb. 17, 1999

(87) PCT Pub. No.: WO97/38252

PCT Pub. Date: Oct. 16, 1997

(30) Foreign Application Priority Data

Apr. 10, 1996 (MX) .................................................. 961341

(51) Int. Cl.⁷ .................................................. F16K 15/20
(52) U.S. Cl. .......................... 137/223; 137/848; 446/224
(58) Field of Search .................................. 137/844, 846, 137/847, 223, 15; 446/224

(56) References Cited

U.S. PATENT DOCUMENTS

| | | | |
|---|---|---|---|
| 3,230,663 | * 1/1966 | Shabram | 44/224 |
| 4,674,532 | 6/1987 | Koyanagi | 137/512.15 |
| 4,758,198 | * 7/1988 | Ishiwa | 137/846 X |
| 5,108,339 | * 4/1992 | Kieves | 446/224 X |
| 5,188,558 | * 2/1993 | Barton et al. | 446/224 |
| 5,248,275 | 9/1993 | McGrath et al. | 446/224 |
| 5,295,892 | 3/1994 | Felton | 446/224 |
| 5,336,123 | * 8/1994 | Laske et al. | 446/224 |
| 5,405,479 | * 4/1995 | Anderson | 446/224 X |
| 5,451,179 | * 9/1995 | LaRoi, Jr. et al. | 446/224 |
| 5,595,521 | * 1/1997 | Becker | 446/224 |
| 5,733,406 | * 3/1998 | Knight | 446/224 X |
| 5,830,780 | * 11/1998 | Dennison et al. | 137/844 X |
| 5,878,768 | * 3/1999 | Carrasco | 137/15 |
| 5,934,310 | * 8/1999 | Littlehorn | 137/223 |

* cited by examiner

Primary Examiner—John Rivell
Assistant Examiner—Meredith H. Schoenfeld
(74) Attorney, Agent, or Firm—Cox & Smith Incorporated (57) ABSTRACT

This invention is related to a self-sealing valve for inflatable articles, including balloons, made of non-elastomeric material of the kind of valves formed by multiple layers of thermo-plastic film joined by heat which form three sections; a nozzle, main channel and a multi-valved section. This valve design permits the production of balloons or inflatable objects with a valve without requiring sophisticated machinery for the exact placement of the valve in the article or balloon. This is characterized in that the nozzle of the article consists of four films; two external films with an outer face that is compatible with heat fusion with the material of the inflated article in which the valve is to be placed and inner faces that are compatible with each other and the inner films with outer faces that are compatible with the outer films and inner faces that are incompatible with each other and outer films.

5 Claims, 7 Drawing Sheets

SELF-SEALING VALVE FOR BALLOONS OR NON ELASTOMER ARTICLES, OBTAINED BY A MASS PRODUCTION PROCESS

BACKGROUND TO THE INVENTION

In the current market there is a wide variety of self-sealing valves and systems to implant them in the balloon body, especially the so-called metallic or non-metallic elastomers. All of them have a common characteristic as regards to long life in comparison with balloons made out of rubber or latex which are the most popular and most known among preceding generations.

All self-sealing valves that make up prior art have the same conformation pattern, as well as several similarities that are mentioned below:

All valves that make up the previous technology consist of a channel defined by two thermoplastic sheets or films which are compatible with each other and the material that makes up the inner wall of the balloon into which said valves are incorporated. All of these valves in their rectangular presentation are a completely finished product before their incorporation into the balloon wall. Thus it could be said that these prior art valves are alien to the balloon body since their implementation, not only in a balloon, but in any product configured by thermoplastic films, such as bags and packaging likewise being independent of the configuration and size of the article, with the only requirement being that the materials used in the manufacture of these products be compatible with the material with which such valves are made.

Another similarity common to prior art valves is that theses valves always have an inlet and outlet valve in their configuration to be implanted in the balloon body and a channel along the length of the valve body, said channel being bounded by lateral and parallel seals along the entire length of the valve body or almost its entire length, thus creating accurate passage or channel seals through which the liquid may flow to fill the balloon.

Both the configuration of the seal lines and channel may in some cases be curved, not straight and the width may vary throughout the length of the channel.

The kind of valves that we are concerned with, always related to those considered as being prior art, have an additional common characteristic, a small area printed with special heat-resistant ink which prevents heat sealing in this area of the valve once it is subject to implanting in the corresponding balloon and it adheres to the balloon body with the application of heat, thereby defining the Inflating fluid access passage, thanks to the print with the special above mentioned ink in the area bounded by said ink. Done otherwise, when implanting said valve and sealing it to the walls of the balloon neck, there would be no access passage for the inflating element and once said valve is implanted would only be obtained through the perforation or cut made in the front wall of the balloon neck.

As a consequence of the procedure followed to implant the valve in the inner walls of the corresponding balloon body, and also considering the specific heat application areas for the adhesion of the valve to said balloon, most of the valve body becomes a pendant without a specific use within the valve body which, to a certain extent, affects the quality and presentation of the product, especially In the case of relatively small balloons made of non-elastromeric plastic material.

An additional characteristic that, to a certain extent, is common to previous art products is related to the equipment used to implant valves in the balloon which required, and considering that the valve is handled as an additional body, the use of very sophisticated and expensive equipment which synchronizes the placement of both layers that make up the balloon body with the placement of the valve, since a fault, however small, would lead to the erroneous placement of the valve and the consequent waste of production line materials.

A clear case could be used to exemplify the kind of product we are concerned with, that is, the U.S. Pat. No. 4,927,646 granted on Apr. 17, 1990 invented by Mr. Gary Kieves which refers to a self-sealing flexible plastic valve for a balloon manufactured with a non-latex film. Said valve is manufactured with two flexible plastic sheets joined together to define a both a valve inlet and outlet and a passage with the inlet end of one of the sheets making up said valve overlapping the other to provide a placement fin which is joined to the balloon sheets in such a way that the inlet valve is placed within the balloon nozzle. A joint barrier at the inlet end prevents the total sealing of the nozzle during the manufacture of the balloon and also facilitates the automatic insertion of the valve in the balloon. The context of said application is incorporated as one of many documents making up the previous art.

On the basis of the above, it could be concluded that there is still a wide field for research and development in the design of valves for balloons arid other inflatable articles which tend to facilitate the manufacture of these products to make them competitive for products with smaller dimensions and consequently at a lower cost, while still guaranteeing a high quality product with a minimum distribution and market placement cost, and also facilitating the use of manufacturing equipment with lower investment costs, easier use and more recent in application, plus many other advantages that could be discovered as we describe the invention we are dealing with.

In order to make the benefits offered by the product referred to in this application in relation to previous technology products clearly understood, it is suffice to say that one of the elements that contributes to the high cost of the product is, among others, the complexity of the manufacturing processes performed to obtain the finished product with the previous technology; said stages could be summarized in the following manner, depending on whether the valves to be inserted are fed from a continuous roll with prefabricated and finished valves or by independent elements, i.e., one by one.

Stages of the valve-implanting process in a balloon fed on a roll basis:

A) a programmed feed is required that guarantees the delivery or freeing of just one valve per balloon;

B) a measured cut of the valve is required in order to avoid damage due to an incorrectly placed cut, which would obviously make said valve useless;

C) place the valve by means of a belt or arm in the exact place for implantation in the balloon body, initially fixing it to one of the balloon walls with heat;

D) seal the valve to the walls of the inflatable body, limiting such sealant to the obligatory positioning area in order to avoid producing a scrap product rather than a correctly valved one.

In reference to the procedure for the placement of a valve in an inflatable article, such as a balloon, which is done on the basis of individual feed, the procedure consists of the following steps:

a) cartridges or magazines are loaded to be used as a container for a given number of stacked valves, which implies constant replenishment of said container;

b) each one of the valves has to be collected from the respective cartridge or magazine by means of a positioning arm which in itself is a vacuum that acts on the valve to be picked up and placed In the exact position of the balloon;

c) the valve is delivered to the positioning area by the same positioning arm or belt and then, or simultaneous to this operation, it is initially sealed to at least one of the balloon walls and then;

d) the final stage corresponding to the total sealing of the valve to the neck walls or balloon tail is carried out.

From the above, it can be concluded that the implantation of the valve in the inflatable article according to the previous technology technique requires very accurate synchronized actions that ensure the placement of the valves in the inflatable article, this logically implies the acquisition of very complex equipment which requires high technology and an investment that may be too expensive, especially in the manufacture of small-sized balloons whose low market price cannot justify such investment; further it will be necessary to re-size and even redesign valves made with the current procedure because otherwise the valve length would exceed the balloon limits. It can be concluded that such valves would be inappropriate in some way or another for the kind of balloons considered here.

OBJECTIVES OF THE INVENTION

The main objective of the invention is the production of small, inexpensive balloons fitted with self-sealing valves by means of a simplified mass- and multiple-production procedure that avoids the use of complex synchronization methods for the placement of the valve in the balloon and also avoid wastage due to defective products.

A further objective of the invention is to provide a balloon manufacturing system of the type mentioned above with just one heat-sealing and simultaneous cut action that produces a product which includes a self-sealing valve, without having to add an external prefabricated valve unit to the balloon body.

Another objective of the invention is to supply a balloon manufacturing system of the type mentioned above by which more than one balloon may be manufactured simultaneously, thus ensuring high production per equipment unit of time used in production.

Yet another objective of the invention is the use of simplified equipment in the manufacture of inflatable articles without the need for further equipment to ensure the measurement of valves in respect to the balloon neck, thus avoiding the production of defectives due to the misplacement of valves in the body of said articles.

Another objective of the invention is to provide balloon manufacturers with pre-processed material for the production of balloons with self-sealing valves which makes it possible to manufacture balloons without the integration of a prefabricated valve.

A further objective of the invention is to lower the production cost of manufacturing small balloons or inflatable articles with a self-sealing valve to place them on the market at a relatively low price.

Figure 1:
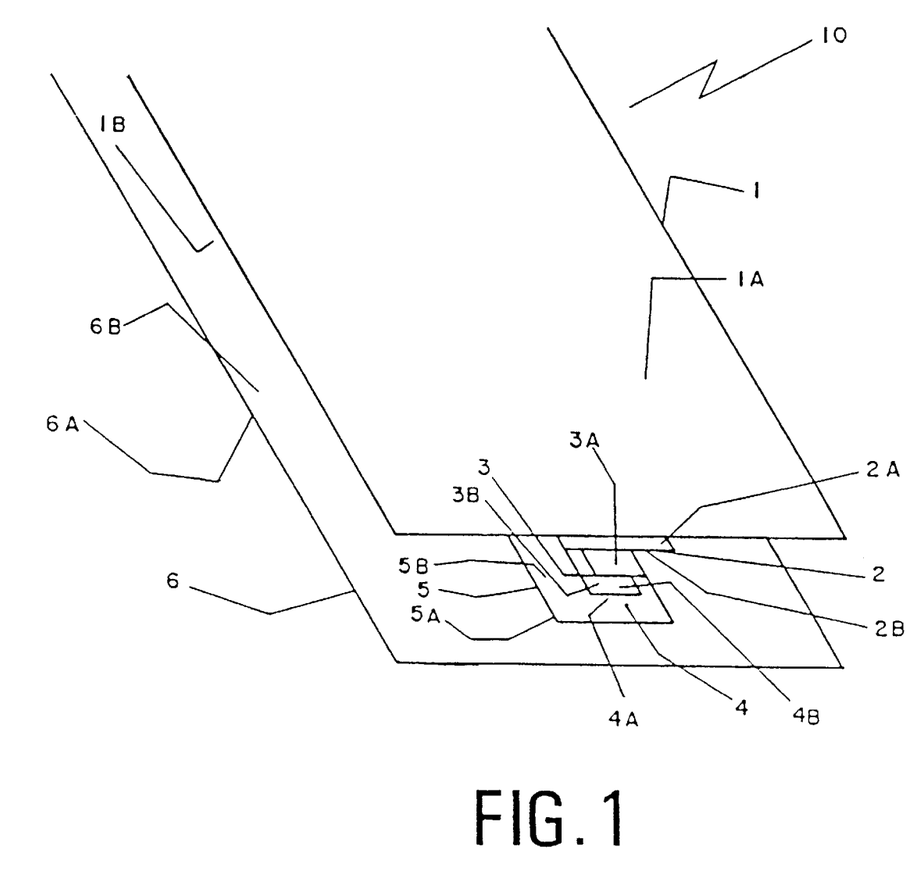
FIG. 1 is a view showing the various sheets of laminated material that constitute the finished balloon.

In reference to the accompanying figure and especially the first, it should be noted that in conformity with the parameters of the techniques of the invention referenced in this application, the various sheets or laminated materials constituting the balloon produced or resulting from the manufacturing system of the invention, there are generally two laminated bodies (1 and 6) which basically constitute the balloon body and whose 1B and 6B inner faces are compatible each other sealing them by heat; 1A and 6A outer faces do not have to be compatible trought heat sealing.

Laminated bodies 2 and 5 are the intermediate sheets with 2A, 2B and 5A and 5B inner and outer faces, respectively. The materials with which these two laminated bodies or plastic sheets are made compatible with heat seal, with 1B and 6B faces of layers 1 and 6 and with each other.

The innermost laminated bodies 3 and 4 are made up of a heat-sealing plastic material, but are not heat-sealing compatible with each other, or they may be configured by a layer of ink or a metallic coating that may be aluminum vapor and/or heat resistant varnish, in which case a layer of laminated material per se is not configured, but rather a coating on the inner 2B and 5B faces of laminated bodies 2 and 5, respectively.

It is also possible that the material with which layers 3 and 4 are made may be a combination of the above mentioned materials.

Figure 2:
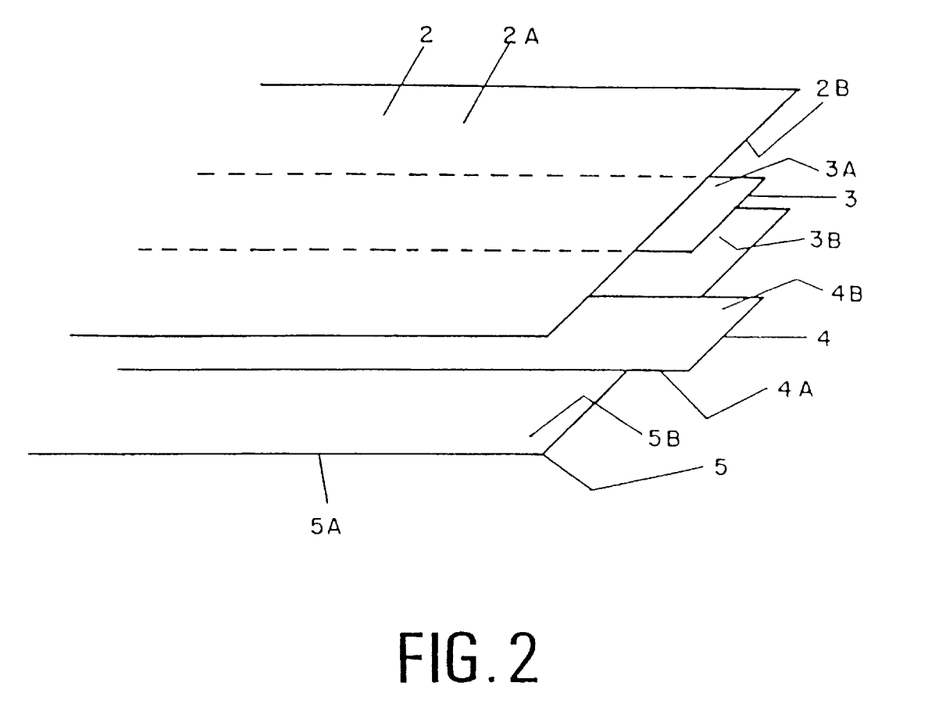
FIG. 2 is a view showing the sheets of laminated material that constitute the balloon valve invented.

FIG. 2 gives a rather diagrammatic view of sheets 2, 3, 4 and 5, which are those in which the valve is configured in the finished product or balloon. In this figure, together with FIG. 3, it can be clearly seen that sheets 2, 3, 4 and 5 indeed make up a preestablished sandwich totally separated from sheets 1 and 6 which are those that definitively give shape to the balloon. It can be particularly noted in FIG. 3, that in order to ensure a better quality self-sealing valve, and always within the spirit of the invention, sheets 2 and 5 are provided with parallel heat seal lines (12) which result in passages 21, that are interrupted in a central band by the location of the laminated sheets (3 and 4) that are heat-sealer incompatible with each other.

Figure 3:
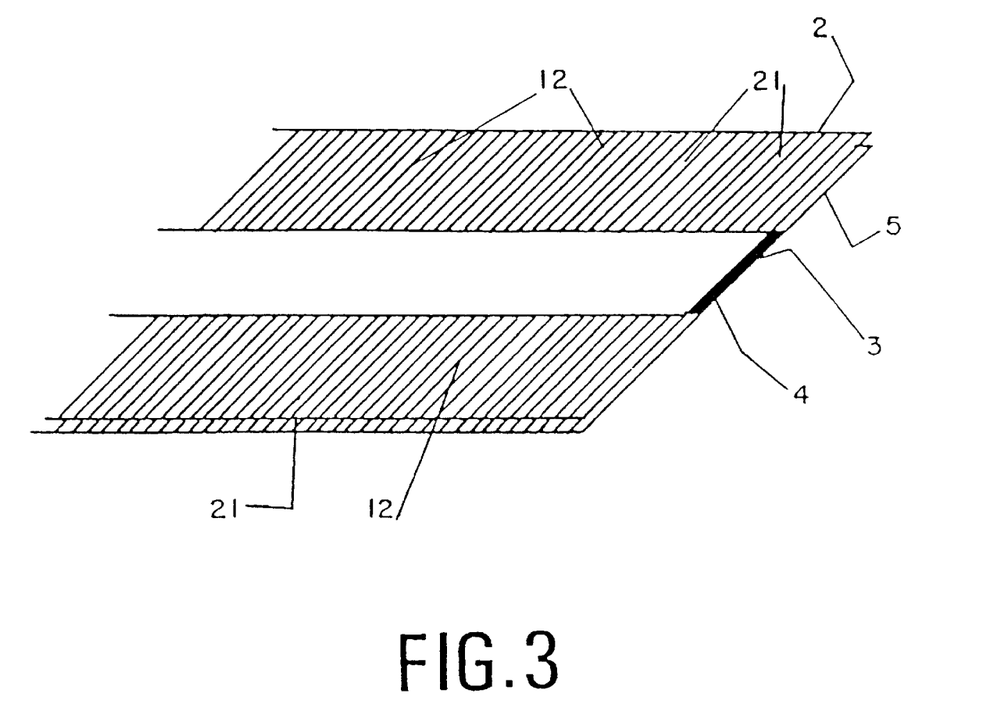
FIG. 3 is an additional view showing the multi-layer material that constitute or configure the balloon valves invented.
Figure 7:
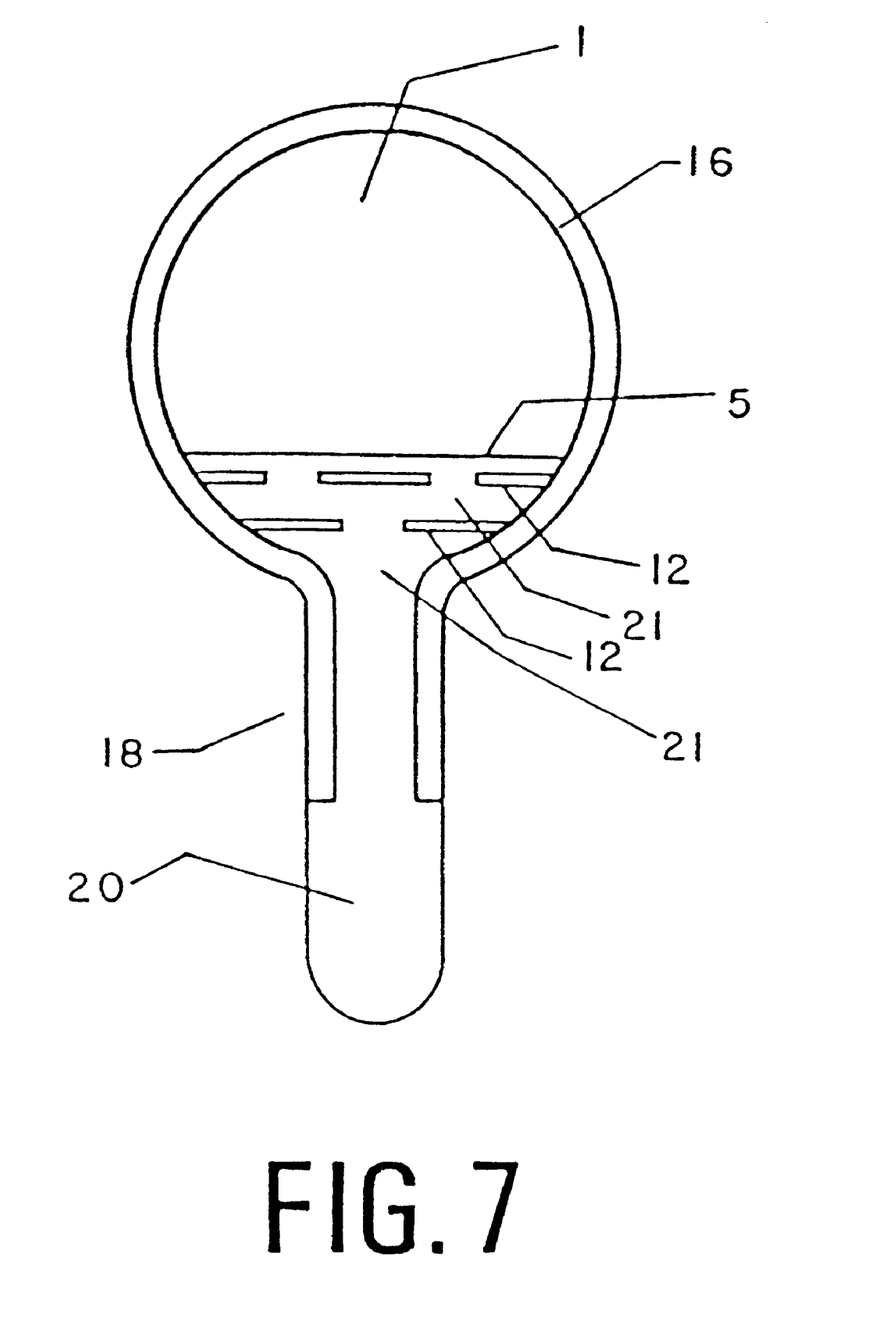
FIG. 7 is a diagrammatic view of one balloon body face in the deflated state, according to another form of the invention.

As a way to obtain good results, not as optimum as with the above mentioned parallel heat seal lines (12), regarding FIG. 3, it is possible to do away with the heat seal parallel lines (12); however, this form does not fully ensure the permanent inflation of the finished product. Another form is the partial labyrinth type heat seal lines made in parallel to the valve generating belt, as shown in FIG. 7 of the attached drawings.

It should be mentioned that the type of material that could be used for laminated materials 1 and 6 integrating the balloon or valve bodies have no limitation other than a correct selection in reference to the compatibility of the heat seal between the various materials thereof which may have a gauge between 12 and 75 microns, provided that there is absolute seal incompatibility between the inner faces or sections coated with lacquer, ink or varnish that are incompatible to heat sealing between 3B and 4B of layers 3 and 4. When lacquer, ink or varnish are used, the term 3B and 4B "inner faces" for sheets 3 and 4 is inapplicable since we are dealing with only a coating. Naturally, inner faces 2B and 5B of sheets 2 and 5, respectively must be compatible with each other in order to provide the heat-sealing of the 12 heat-sealing lines defined above in relation to FIG. 3 of the attached drawings.

Figure 4:
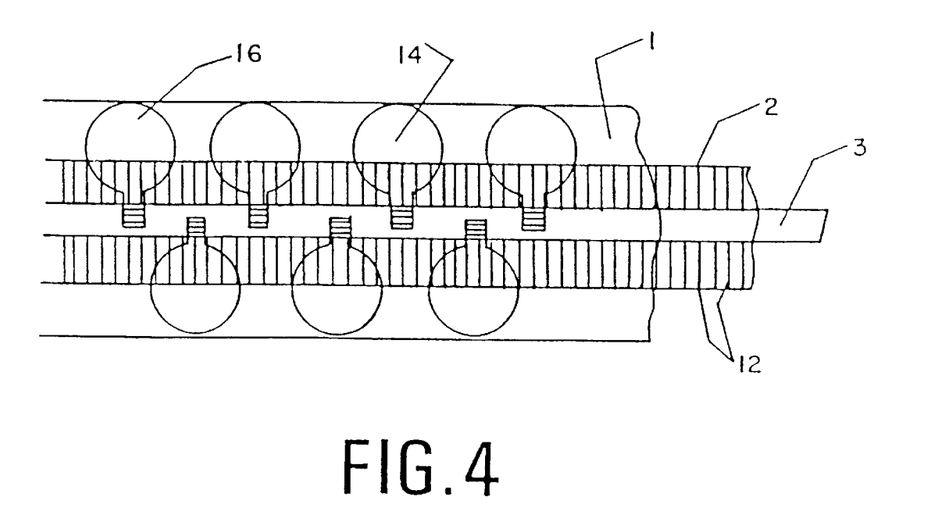
FIG. 4 is a diagrammatic view of the distribution of the balloons invented arid the material used in their manufacture.

FIG. 4, which is a diagrammatic representation of the sealing phase of the periferical seal and die cutting of the balloon, clearly shows a better distribution of balloons to be manufactured on a production line which, as can be seen in FIG. 4, are laid out in opposite directions. However, a more suitable orientation of said balloons could be found which permits more efficient production of said articles per unit of width of materials 1 to 6 fed to the production equipment. It has been found that the most efficient layout corresponds to approximately 45° in respect to the feed line of various materials 1 to 6 which are fed to the production equipment, with which balloons of the same size are obtained with the least waste of material, or a higher number of units produced per square meter of materials consumed.

Figure 5:
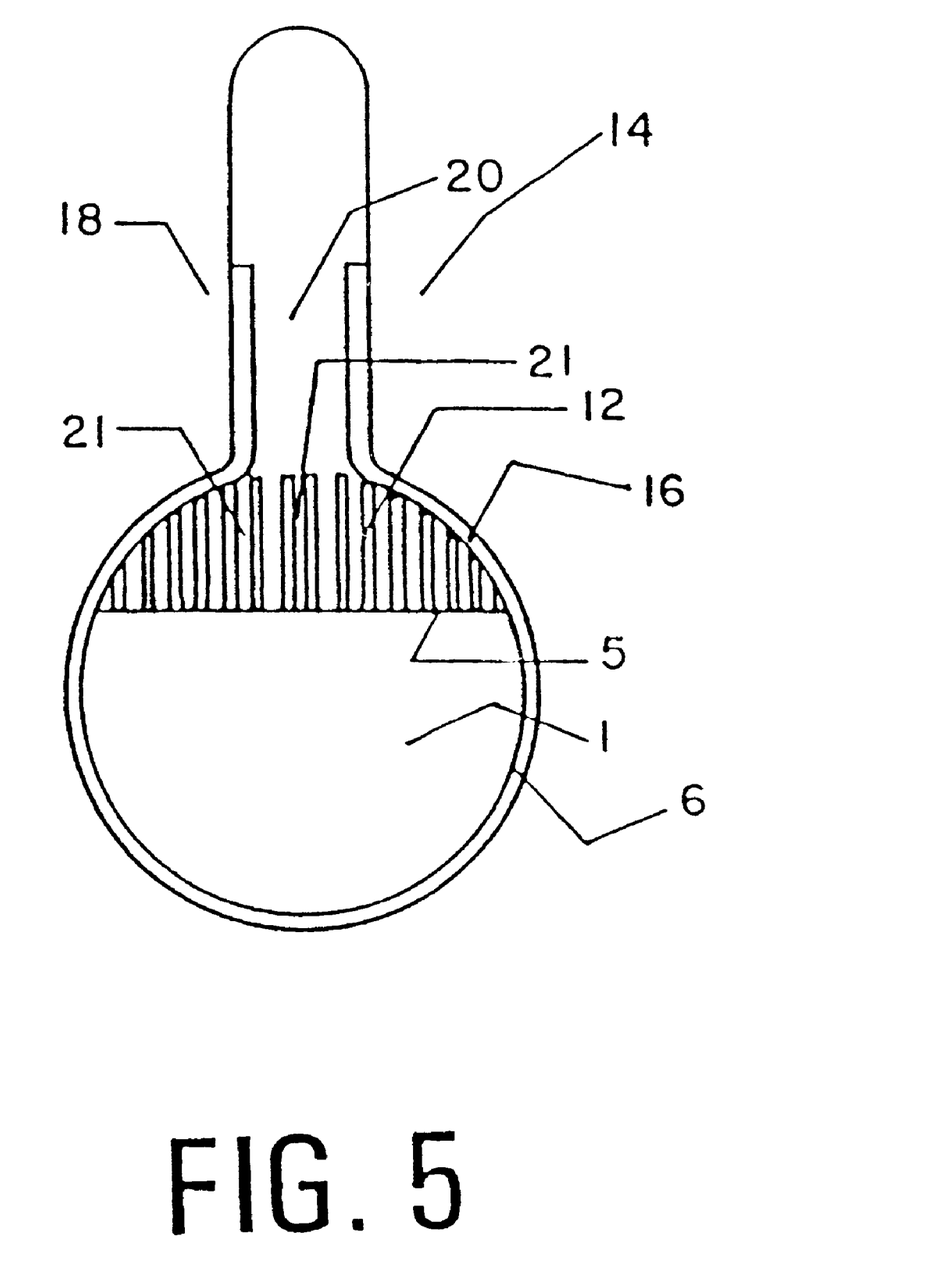
FIG. 5 is a diagrammatic view of the balloon body faces in the deflated state.
Figure 6:
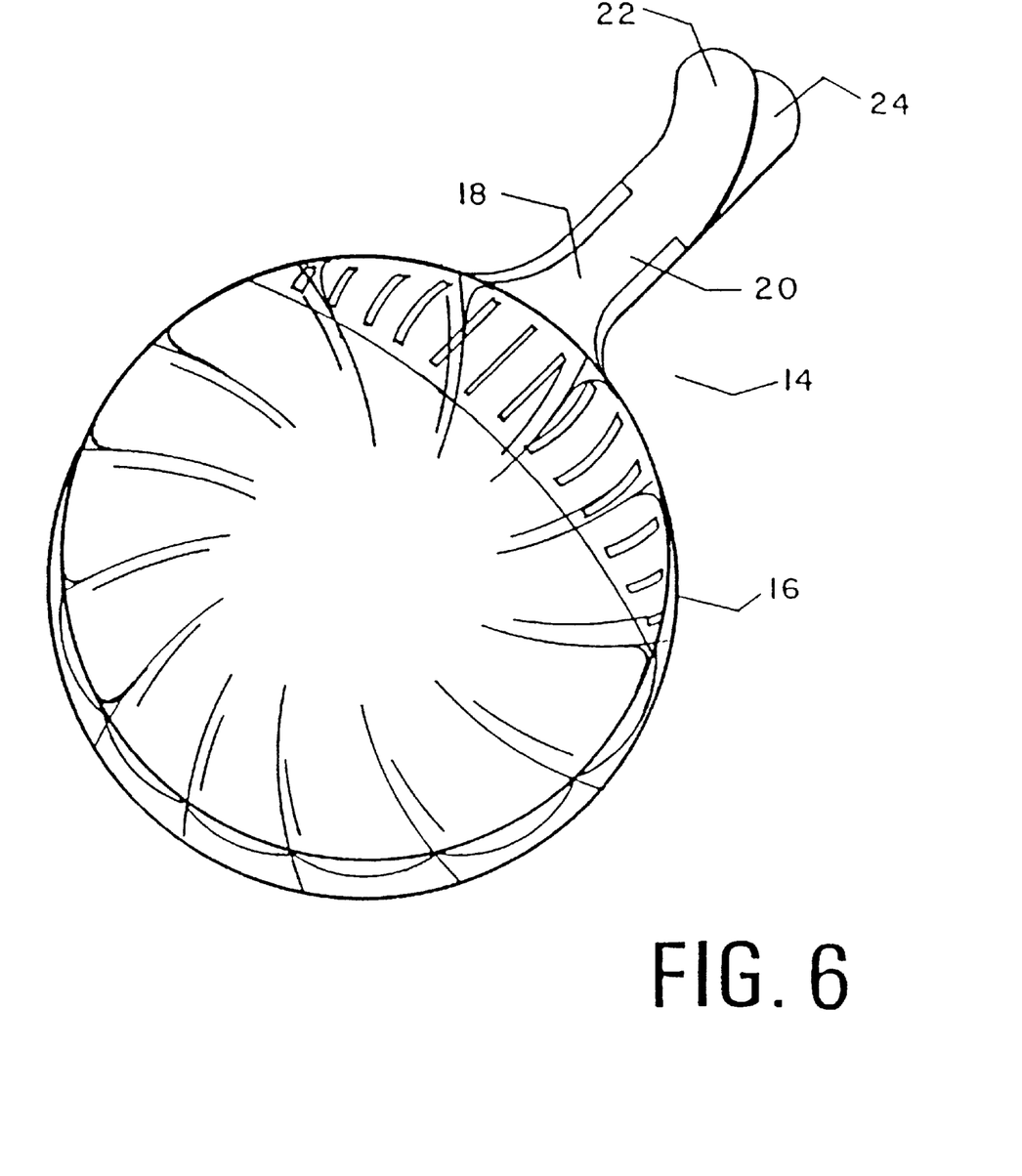
FIG. 6 is a view of the inflated balloon of the invention as a finished product, in accordance with the invention parameters.

FIGS. 5 and 6 of the attached drawings show balloon 14 produced in accordance with the parameters of the invention described and claimed herein, in which it can be noted that said balloon is integrated by outer sheets 1 and 6 made of a heat compatible material joined together in peripherical line (16).

The above mentioned figures also show that ends 22 and 24 of neck 18 of balloon 14 are not joined due to the material or varnish being incompatible to the heat seal with which sheets 3 and 4 are made. which as was clarified above, may be constituted by a laminated aluminum material, heat-resistant paint or even some kind of resin that prevents a joint between them even in case of application of heat.

In FIGS. 5 and 6 show finished balloon 14; it should also be noted that in this case and coincidentally, a 21 passage configured between laminated materials layers 2 and 5 check with passage 20 contributing to the intrinsic formation of a self-sealing nozzle for small-sized balloons at a relatively low cost, since the production of this kind of balloon is made, as was mentioned before, with a multiple amount for each production cycle.

In FIG. 6 it can be noted that for the inflation of balloons of this kind it is suffice to separate free outer parts 22 and 24 from neck 18 and the user can inflate the balloon by blowing or the insertion of some kind of nozzle through passage 20 of neck 18. The permanent and high-reliability seal of the product is established in a much more reliable manner due to the deformation within the balloon of presealed layers 2 and 5 with the configuration of 21 air passages established by 12 parallel joint lines. Said joint lines may be 4 mm to 30 mm apart in accordance within the diameter or width of the balloon or inflatable article and, as described above, the lines (12) may be perpendicular or at an angle or parallel to the band generator belt, the latter being configured in a labyrinth through which the liquid flows in zigzag passages.

Given the above, it is obvious that all the objectives proposed in reference to the product developed are in accordance with the invention parameters; however, it is obvious that some changes could be proposed by experts in the field. Nevertheless, it is proposed that these changes form part of this application, provided that they fall within the scope and spirit of the attached clauses.

Having described the invention at length, I consider it as a novelty and then I claim as property the content of the following clauses:

1. A valve for inflating articles, comprising:
   at least four films having proximal ends positioned at an inflation portal of said inflatable article, distal ends positioned beyond said inflation portal of said inflatable article and within said inflatable article, and peripheral edges extending between said proximal and distal ends;
   at least two of said at least four films comprising outer films and at least two comprising inner films, wherein a distance between said proximal and distal ends of said at least two outer films is greater than a distance between said proximal and distal ends of said at least two inner films, said at least two inner films further being located between;
   said at least two inner films, positioned substantially opposite to each other, and being incompatible to sealing with each other so as to allow passage of gas or liquid between them from the exterior to the interior of said inflatable article, and said at least two outer films positioned substantially opposite to each other, located at least partially within said inflatable article, and being compatible to sealing with each other and to an interior of said inflatable article;
   wherein said at least two outer films are sealed together except for a portion thereof maintained separate by said at least two inner films positioned partially therebetween, said sealing defining a plurality of channels between said at least two outer films, which channels extend into said inflatable article at said distal ends of said at least two outer films, and wherein said peripheral edges of said at least four films are sealed together with a periphery of said inflatable article where said peripheral edges contact said inflatable article.

2. The apparatus of claim 1, wherein said plurality of channels comprise at least two parallel sealing lines positioned apart from each other at a distance in the range of approximately 4 mm to 30 mm.

3. The apparatus of claim 1 or 2, wherein said plurality of channels comprise at least two sealing lines positioned perpendicular to each other.

4. The apparatus of claim 1, wherein said seals between said films are formed by applying heat to limited areas of said films.

5. The apparatus of claim 1, wherein said at least two inner films comprise a material selected from the group consisting of varnish, lacquer, ink and aluminum vapor.

* * * * *

UNITED STATES PATENT AND TRADEMARK OFFICE
CERTIFICATE OF CORRECTION

PATENT NO.    : 6,192,917 B1
DATED         : February 27, 2001
INVENTOR(S)   : Ernesto Antonio Romas Loza Page 1 of 1

It is certified that error appears in the above-identified patent and that said Letters Patent is hereby corrected as shown below:

Column 1,
Line 49, "Inflating" should read -- inflating"

Column 2,
Line 14, "a both a" should read -- both a --
Line 26, "arid" should read -- and --

Column 3,
Line 4, "In" should read -- in --

Column 4,
Line 25, "trought" should read -- through --
Line 29, "are made" should read -- are --

Signed and Sealed this

Twenty-eighth Day of August, 2001

Attest:

NICHOLAS P. GODICI
*Acting Director of the United States Patent and Trademark Office*

*Attesting Officer*